United States Patent [19]
Ebara et al.

[11] Patent Number: 5,922,954
[45] Date of Patent: *Jul. 13, 1999

[54] VIBRATION GYROSCOPE AND METHOD FOR ADJUSTING VIBRATION-GYROSCOPE CHARACTERISTICS

[75] Inventors: Kazuhiro Ebara, Toyama; Katsumi Fujimoto, Toyama-ken, both of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/754,704

[22] Filed: Nov. 21, 1996

[30] Foreign Application Priority Data

Nov. 22, 1995 [JP] Japan .................................... 7-328352

[51] Int. Cl.$^6$ ................................................. G01C 19/00
[52] U.S. Cl. ...................................... 73/504.12; 73/504.02
[58] Field of Search ........................... 73/504.02, 504.12, 73/504.13, 504.14, 504.03, 504.04; 310/315, 318, 369

[56] References Cited

U.S. PATENT DOCUMENTS

| | | | |
|---|---|---|---|
| 4,694,696 | 9/1987 | Hojo et al. ................................ 73/497 |
| 5,220,833 | 6/1993 | Nakamura ................................ 73/505 |
| 5,254,898 | 10/1993 | Terajima ................................ 310/321 |
| 5,460,043 | 10/1995 | Terajima ............................... 73/504.12 |

FOREIGN PATENT DOCUMENTS

| | | |
|---|---|---|
| 03010112 | 6/1989 | Japan . |
| 07083670 | 9/1993 | Japan . |
| 05302833 | 11/1993 | Japan . |

*Primary Examiner*—Hezron Williams
*Assistant Examiner*—Richard A. Moller
*Attorney, Agent, or Firm*—Ostrolenk, Faber, Gerb & Soffen, LLP

[57] ABSTRACT

A vibration gyroscope includes a vibrator. The vibrator has a vibration member formed in a regular triangular prism shape. On side faces of the vibration member, three piezoelectric elements are formed, respectively. Two of the piezoelectric elements are connected to the input terminal of an oscillation circuit through resistors which serve as the loads of the two piezoelectric elements, respectively. The output terminal of the oscillation circuit is connected to the other piezoelectric element. The former piezoelectric elements are also connected to the non-inverting input terminal and the inverting input terminal of a differential amplifier circuit, respectively. By changing the impedances of the resistors, the characteristics of the vibration gyroscope is adjusted.

9 Claims, 6 Drawing Sheets ic elements 4*a* to 4*c* each include a
VIBRATION GYROSCOPE AND METHOD FOR ADJUSTING VIBRATION-GYROSCOPE CHARACTERISTICS

BACKGROUND OF THE INVENTION

1. Field of the Invention

The present invention relates to a vibration gyroscope and a method for adjusting the characteristics of the same, and more particularly, to a vibration gyroscope having a detecting device for obtaining a signal corresponding to a rotation angular velocity and a method for adjusting the characteristics of the same.

2. Description of the Related Art

FIG. 6 is a diagram showing an example of a conventional vibration gyroscope. A vibration gyroscope 1 shown in FIG. 6 includes a vibrator 2. The vibrator 2 includes a vibration member 3 having a regular triangular prism shape. The vibration member 3 is made from, for example, permanently elastic metal materials such as elinvar. At nearly the centers of the three side faces of the vibration member 3, three piezoelectric elements 4*a*, 4*b*, and 4*c* are formed, respectively. These piezoelectric elements 4*a* to 4*c* each include a piezoelectric layer made up of ceramic. Each piezoelectric element is provided with electrodes at both primary surfaces of the piezoelectric layer. One electrode on a primary surface of the piezoelectric layer is adhered to a side face of the vibration member and the other electrode, which is disposed on the other primary surface of the piezoelectric layer, is used for signal input and output.

In the vibrator 2, two piezoelectric elements 4*a* and 4*b* are used for feedback and detection, and the other piezoelectric element 4*c* is used for driving. Two piezoelectric elements 4*a* and 4*b* are connected to the input terminal of an oscillation circuit 6 through resistors 5*a* and 5*b* which serve as the loads of the piezoelectric elements. In this case, to use the vibration gyroscope with the highest synchronous-detection efficiency, the impedances of the resistors 5*a* and 5*b* are set equal to the impedances of piezoelectric element 4*a* and 4*b*, which serve as detecting elements, in a matching condition, respectively. The impedance Z of a piezoelectric element in a matching condition is expressed by Z=1/(2πfC), where f indicates the frequency of a driving signal and C indicates the capacitance of the piezoelectric element. The output terminal of the oscillation circuit 6 is connected to piezoelectric element 4*c*. Piezoelectric elements 4*a* and 4*b* are connected to the non-inverting input terminal and the inverting input terminal of a differential amplifier circuit 7, respectively. The output terminal of the differential amplifier circuit 7 is connected to the input terminal of a synchronous-detection circuit 8. The output terminal of the synchronous-detection circuit 8 is connected to the input terminal of a smoothing circuit 9.

When a driving signal output from the oscillation circuit 6 is applied to piezoelectric element 4*c* in the vibration gyroscope 1 shown in FIG. 6, the vibration member 3 vibrates in the direction perpendicular to the primary surfaces of piezoelectric element 4*c*. When the vibration gyroscope 1 rotates about the axis of the vibration member 3 in this state, the direction of vibration of the vibration member 3 changes due to the Coriolis force. Then, a signal according to the rotation angular velocity is generated between the piezoelectric elements 4*a* and 4*b*. This signal is detected by the differential amplifier circuit 7. The signal output from the differential amplifier circuit 7 is synchronously detected by the synchronous-detection circuit 8, and the output signal of the synchronous-detection circuit 8 is smoothed by the smoothing circuit 9. Therefore, the rotation angular velocity is detected from the output signal of the smoothing circuit 9 in this vibration gyroscope 1.

In the vibration gyroscope 1 shown in FIG. 6, the relationship between temperature and sensitivity change rate without any compensation are determined by the temperature characteristics of the ceramic in the piezoelectric layers of piezoelectric elements 4*a* and 4*b*, which serve as detecting elements. To obtain the desired relationship between temperature and sensitivity change rate, the level of a driving signal is changed with the use of a thermistor or diode in a driving-signal processing system including the oscillation circuit 6. Alternatively, the gain of a detected signal is changed with the use of a thermistor or diode in a detected-signal processing system including the differential amplifier circuit 7, the synchronous-detection circuit 8, and the smoothing circuit 9. When a thermistor or diode is used, however, the cost of the vibration gyroscope increases due to high cost of the thermistor or diode, and the number of used components also increases.

To improve the response of the vibration gyroscope 1 shown in FIG. 6, the vibration frequency of the vibrator is increased or the vibrator material is changed. However, to increase the vibration frequency of the vibrator, the size and the shape of the vibrator need to be changed and changes of the circuit constants in the peripheral circuits are also required. These factors cause high cost. To change the vibrator material, the vibrator needs to be changed and changes of the circuit constants in the peripheral circuits are also required. These factors also increase cost.

SUMMARY OF THE INVENTION

Accordingly, it is an object of the present invention to provide an inexpensive vibration gyroscope having the desired relationship between temperature and sensitivity change rate.

Another object of the present invention is to provide an inexpensive, good-response vibration gyroscope.

Still another object of the present invention is to provide a method for inexpensively adjusting the characteristics of a vibration gyroscope.

The foregoing objects are achieved in one aspect of the present invention through the provision of a vibration gyroscope including a vibrator having at least a first detecting element for obtaining a signal corresponding to a rotation angular velocity and at least a first load connected to the detecting element, wherein the impedance of the load is different than the impedance of the detecting element in a matching condition and has a value commensurate with a desired response.

In one aspect of the present invention, the impedance of the load is made lower than the impedance of the detecting element in a matching condition to improve the response of the vibration gyroscope.

In still another aspect of the present invention, the impedance of the load is made higher than the impedance of the detecting element in a matching condition to improve the response of the vibration gyroscope.

In still another aspect of the invention, the vibrator includes a second detection element having a second load connected thereto, the impedance of the second load being different than the impedance of the second detection element and having a value commensurate with a desired response.

Preferably, the desired response is a desired relationship between temperature and sensitivity change rate. In accordance with the foregoing aspects of the invention, a thermistor or diode is not required to obtain the desired relationship between temperature and sensitivity change rate, decreasing the cost of the vibration gyroscope. Additionally, it is not necessary to increase the vibration frequency of the vibrator or to change the vibrator material, in order to improve the response. Thus, further reducing the cost of the vibration gyroscope.

The foregoing objects are achieved in a further aspect of the present invention through the provision of a method for adjusting the characteristics of a vibration gyroscope which has at least a first detecting element for obtaining a signal corresponding to a rotation angular velocity, including the step of connecting at least a first load to the first detecting element, the impedance of the first load being different than the impedance of the first detecting element and having a value commensurate with a desired response.

In accordance with one aspect of the method, the vibrator includes a second detection element, and the method further includes connecting a second load to the second detection element, the impedance of the second load being different than the impedance of the second detection element and having a value commensurate with a desired response.

In accordance with the method for adjusting the characteristics of a vibration gyroscope, a thermistor or a diode is not required, and it is not necessary to increase the vibration frequency of the vibrator or to change the vibrator material, in order to improve the response. The cost of the vibration gyroscope is reduced.

According to the present invention, an inexpensive vibration gyroscope having the desired relationship between temperature and sensitivity change rate is obtained.

According to the present invention, an inexpensive, good-response vibration gyroscope is also obtained.

Furthermore, according to the present invention, a method for inexpensively adjusting the characteristics of a vibration gyroscope is obtained.

The above-described objects, other objects, features, and advantages of the present invention will be further clarified by detailed descriptions in the description of the preferred embodiment which will be mentioned below by referring to the drawings.

DESCRIPTION OF THE PREFERRED EMBODIMENT(S)

Figure 1:
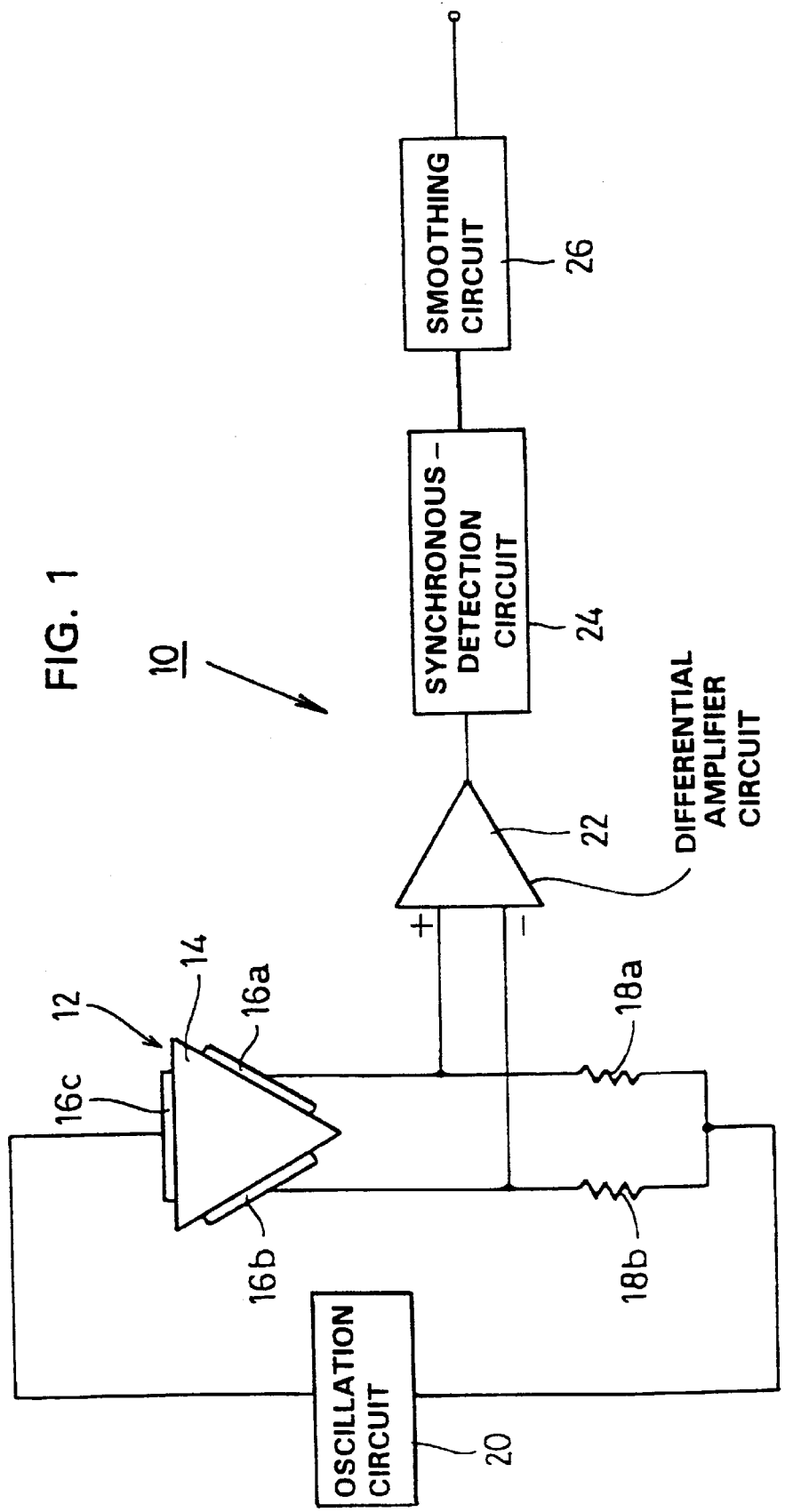
FIG. 1 is a diagram showing a vibration gyroscope according to an embodiment of the present invention.

FIG. 1 is diagram showing a vibration gyroscope according to an embodiment of the present invention. A vibration gyroscope 10 shown in FIG. 1 includes a vibrator 12. The vibrator 12 has a vibration member 14 which is formed, for example, in a regular triangular prism shape. The vibration member 14 is formed, for example, by permanently elastic metal materials, such as elinvar and an iron-nickel alloy.

At nearly the centers of the three side faces of the vibration member 14, three piezoelectric elements 16a, 16b, and 16c are formed, respectively. These piezoelectric elements 16a to 16c each include a piezoelectric layer made up of ceramic. Each piezoelectric element is provided with electrodes at both primary surfaces of the piezoelectric layer. One electrode on a primary surface of the piezoelectric layer is adhered to a side face of the vibration member 14 and the other electrode, which is disposed on the other primary surface of the piezoelectric layer, is used for signal input and output.

In the vibrator 12, two piezoelectric elements 16a and 16b are used for feedback and detection, and the other piezoelectric element 16c is used for driving. The piezoelectric elements 16a and 16b are connected to the input terminal of an oscillation circuit 20 through resistors 18a and 18b which serve as the loads of the piezoelectric elements. The output terminal of the oscillation circuit 20 is connected to piezoelectric element 16c.

The piezoelectric elements 16a and 16b are also connected to the non-inverting input terminal and the inverting input terminal of a differential amplifier circuit 22, respectively. The output terminal of the differential amplifier circuit 22 is connected to the input terminal of a synchronous-detection circuit 24. The output terminal of the synchronous-detection circuit 24 is connected to the input terminal of a smoothing circuit 26.

When a driving signal output from the oscillation circuit 20 is applied to piezoelectric element 16c in the vibration gyroscope 10, the vibration member 14 vibrates in the direction perpendicular to the primary surfaces of piezoelectric element 16c. When the vibration gyroscope 10 rotates about the axis of the vibration member 14 in this condition, the direction of vibration of the vibration member 14 changes due to the Coriolis force. Then, a signal according to the rotation angular velocity is generated between the piezoelectric elements 16a and 16b, which serve as detecting elements. This signal is detected by the differential amplifier circuit 22. The signal output from the differential amplifier circuit 22 is synchronously detected by the synchronous-detection circuit 24, and the output signal of the synchronous-detection circuit 24 is smoothed by the smoothing circuit 26. Therefore, the rotation angular velocity is detected from the output signal of the smoothing circuit 26 in this vibration gyroscope 10.

In this vibration gyroscope 10, the desired relationship between temperature and sensitivity change rate can be obtained by differentiating the impedances of the resistors 18a and 18b from those of piezoelectric elements 16a and 16b in a matching condition. The details will be described below.

Figure 2:
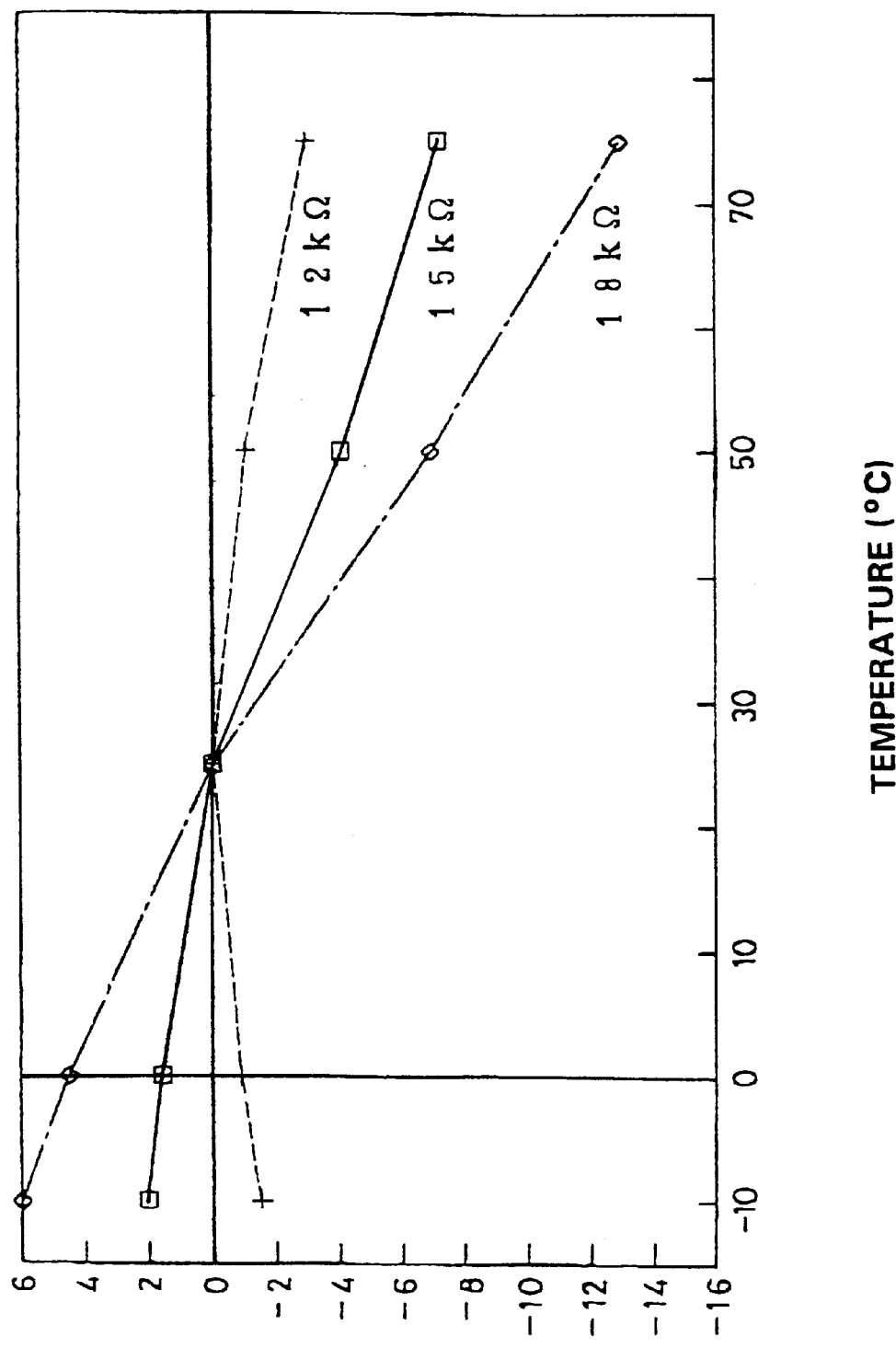
FIG. 2 is a graph indicating the relationship between temperature and sensitivity change rate of the vibration gyroscope shown in FIG. 1.

FIG. 2 shows the relationship between temperature and sensitivity change rate at 25° C. with sensitivity being used as a reference in the vibration gyroscope 10 with the impedances of piezoelectric elements 16a and 16b in a matching condition being set to 15 kΩ and those of the resistors 18a and 18b being set to 12, 15, or 18 kΩ. As clearly understood from the graph shown in FIG. 2, when the impedances of the resistors 18a and 18b are set to the same (15 kΩ) as those of piezoelectric elements 16a and 16b in a matching condition, the relationship between temperature and sensitivity change rate has a negative gradient. When the impedances of the resistors 18a and 18b are set to smaller (12 kΩ) than those of piezoelectric elements 16a and 16b in a matching condition, the relationship between temperature and sensitivity change rate has a substantially flat gradient. In contrast, when the impedances of the resistors 18a and 18b are set to larger (18 kΩ) than those of piezoelectric elements 16a and 16b a matching condition, the relationship between temperature and sensitivity change rate has a large negative gradient.

When the impedances of the resistors 18a and 18b are set to smaller-or larger than those of piezoelectric elements 16a and 16b in a matching condition, the response of the vibration gyroscope 10 is improved. The details will be described below.

Figure 3:
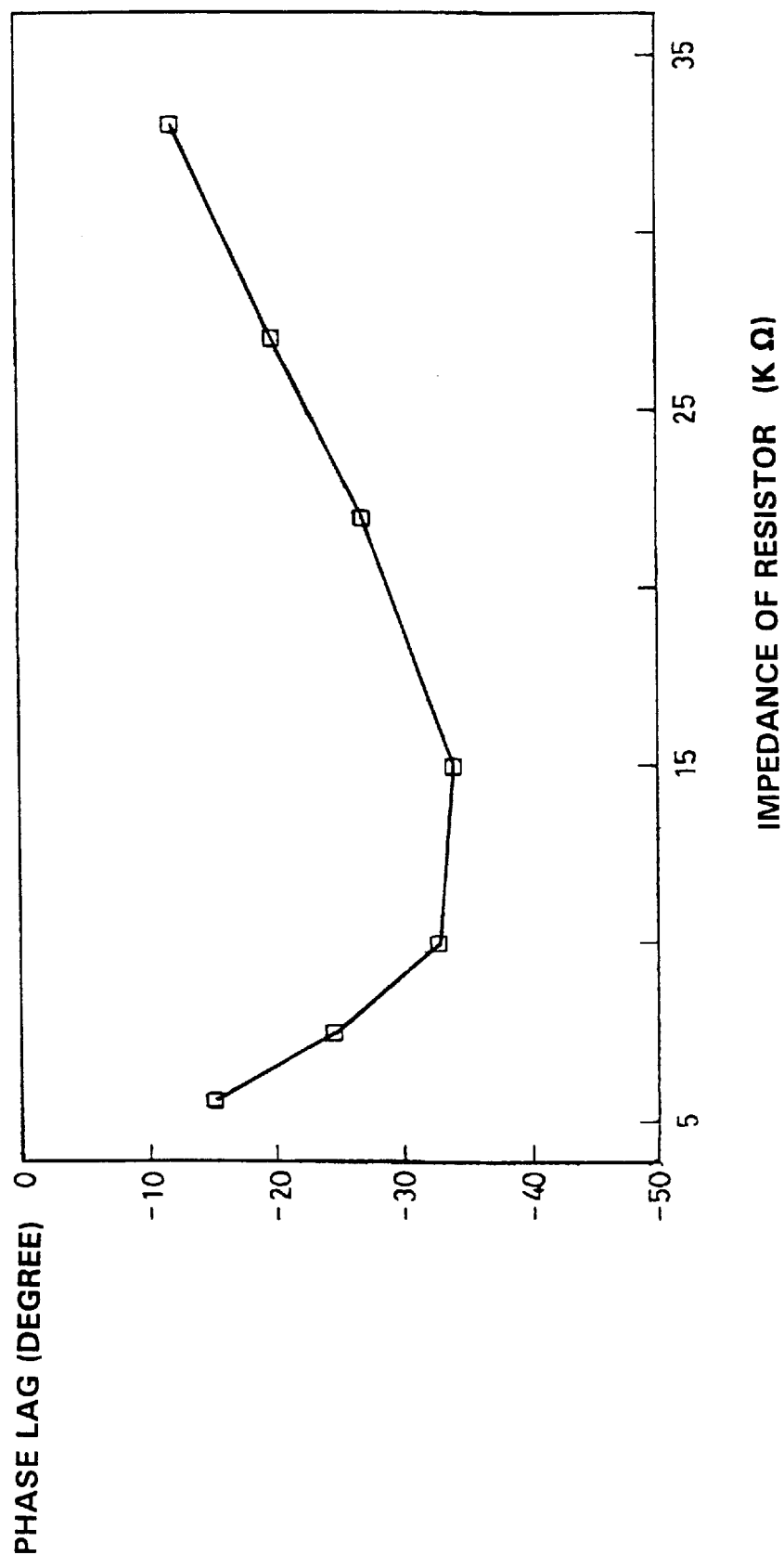
FIG. 3 is a graph indicating the relationship between impedance and phase lag of a resistor in the vibration gyroscope shown in FIG. 1.

FIG. 3 shows the phase lag of the signal output from the smoothing circuit 26 against the rotation angular velocity in the vibration-gyroscope 10 with a rotation angular velocity of 30 Hz being applied and with the impedances of piezoelectric elements 16a and 16b in a matching condition being set to 15 kΩ and those of the resistors 18a and 18b being set to 5.6 to 33 kΩ. As clearly understood from the graph shown in FIG. 3, when the impedances of the resistors 18a and 18b are set to the same as those (15 kΩ) of piezoelectric elements 16a and 16b in a matching condition, the phase lag of the output signal is large. When the impedances of the resistors 18a and 18b are set to smaller or larger than those (15 kΩ) of piezoelectric elements 16a and 16b in a matching condition, the phase lag of the output signal becomes small.

When the impedances of the resistors 18a and 18b are set to larger than those of piezoelectric elements 16a and 16b in a matching condition, the detecting sensitivity of the vibrator increases and the S/N ratio is improved. The details will be described below.

Figure 4:
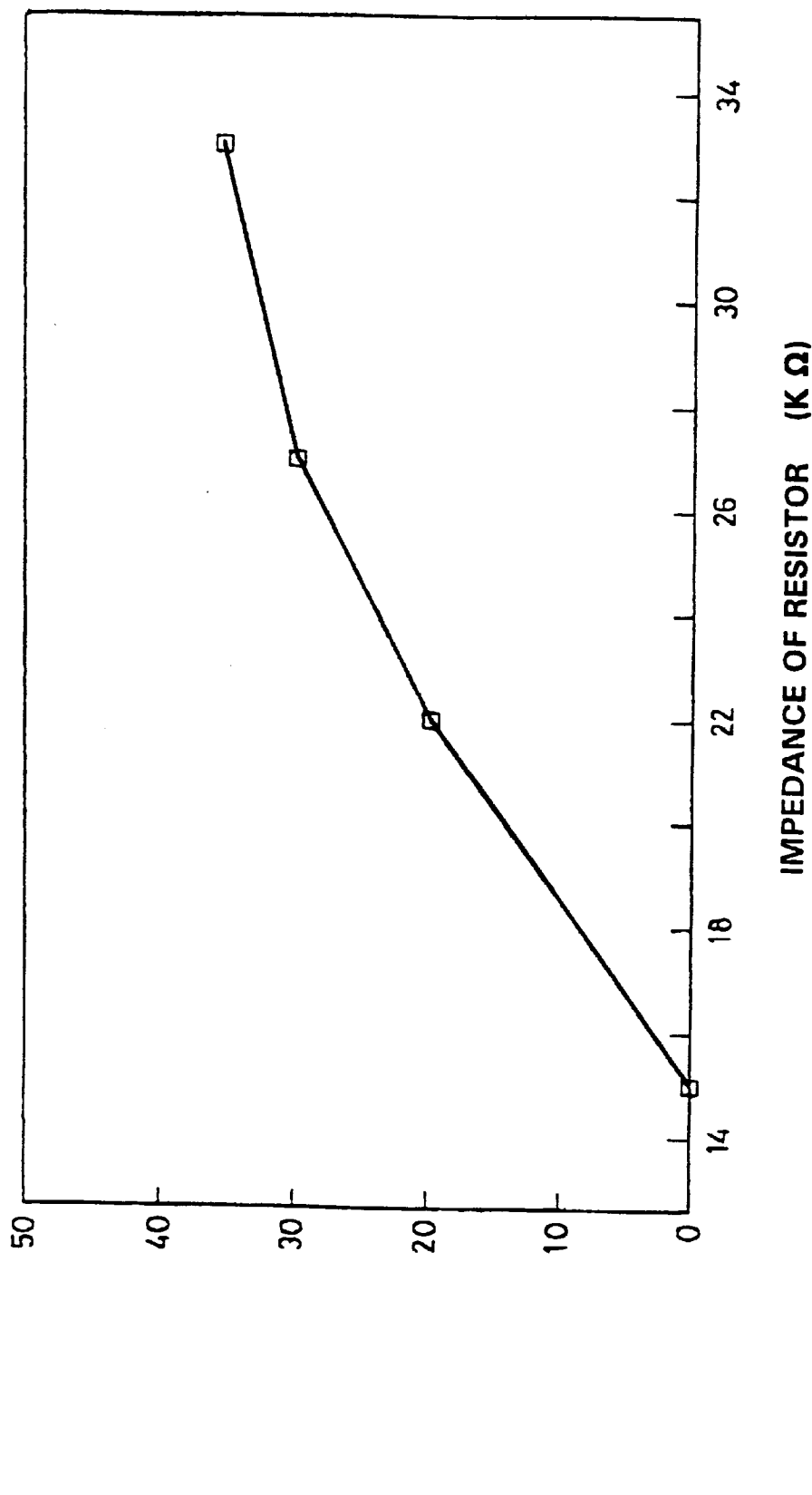
FIG. 4 is a graph indicating the relationship between impedance and sensitivity change rate of a resistor in the vibration gyroscope shown in FIG. 1.

FIG. 4 shows the sensitivity change rate of the vibration gyroscope 10 with the impedances of piezoelectric elements 16a and 16b in a matching condition being set to 15 kΩ and those of the resistors 18a and 18b being set to 15 to 33 kΩ. As clearly understood from the graph shown in FIG. 4, when the impedances of the resistors 18a and 18b are set to larger than those (15 kΩ) of piezoelectric elements 16a and 16b in a matching condition, the detecting sensitivity of the vibrator increases and the S/N ratio is improved.

Figure 5:
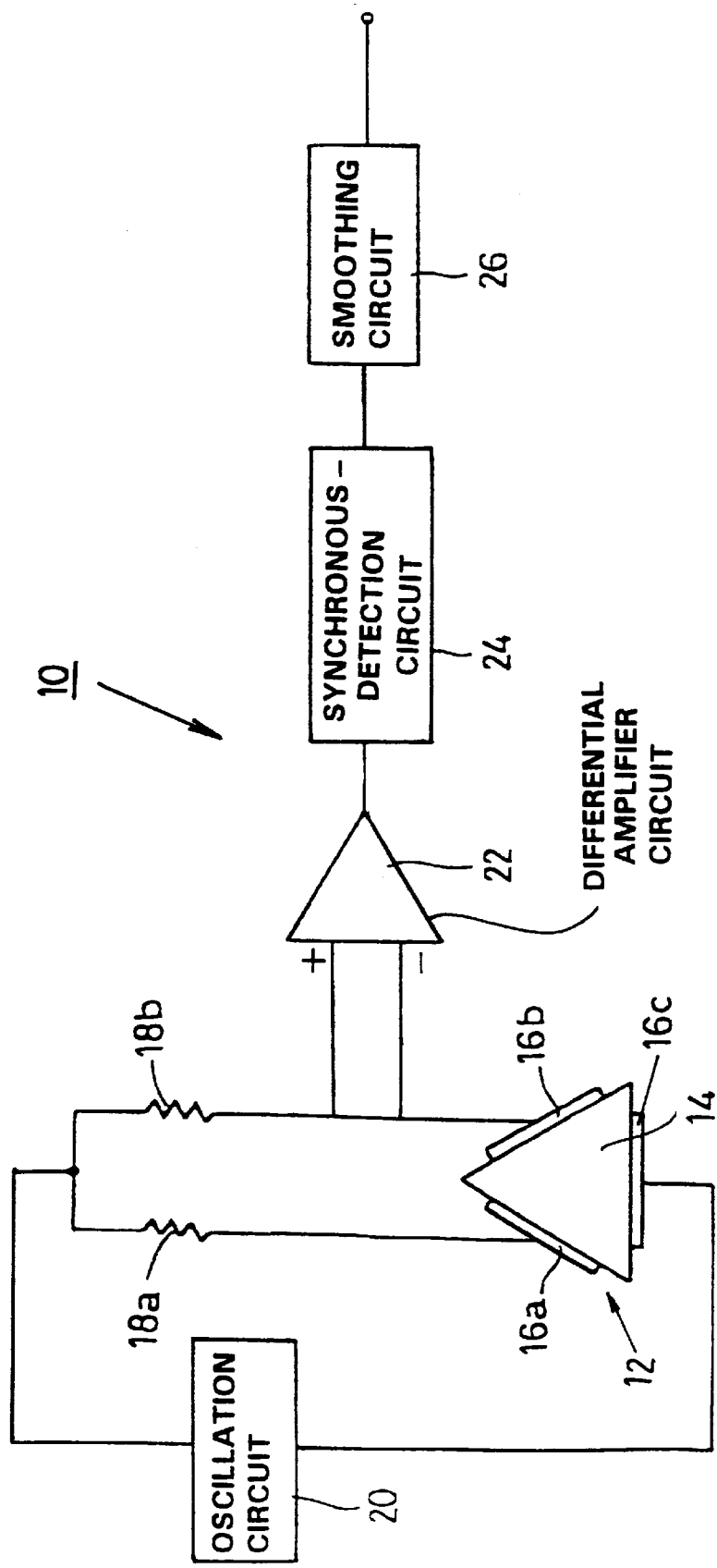
FIG. 5 is a diagram showing a vibration gyroscope according to another embodiment of the present invention.
Figure 6:
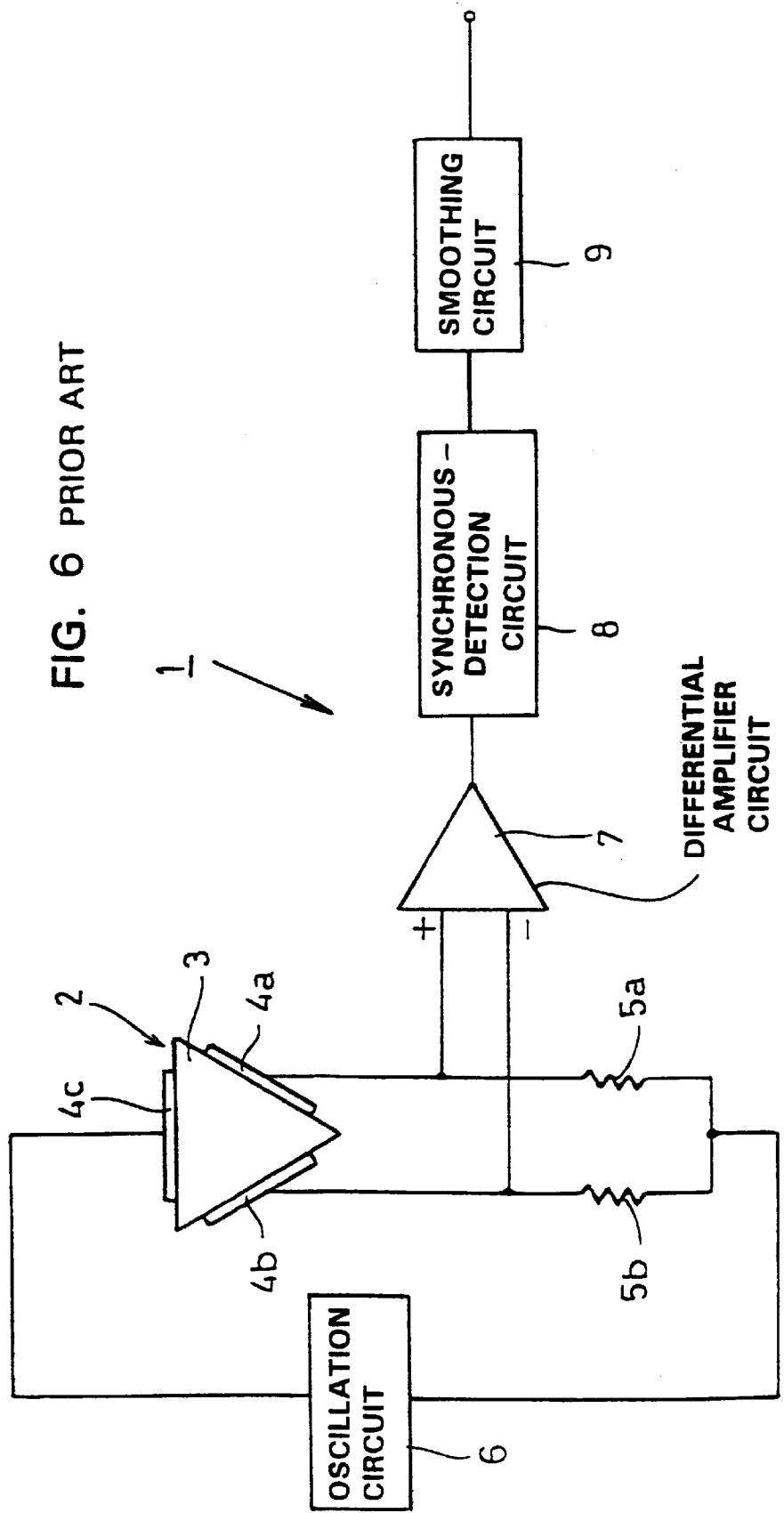
FIG. 6 is a diagram showing a conventional vibration gyroscope.

In the above-described vibration gyroscope 10, two piezoelectric elements 16a and 16b are used for feedback and detection, and the other piezoelectric element 16c is used for driving. The vibration gyroscope may be configured such that two piezoelectric elements 16a and 16b serve as driving means and detecting means and the other piezoelectric element 16c is used as feedback means. In this case, as shown in FIG. 5, the piezoelectric element 16c is connected to the input terminal of the oscillation circuit 20, and the output terminal of the oscillation circuit 20 is connected to piezoelectric elements 16a and 16b through resistors 18a and 18b which serve as the loads of piezoelectric elements 16a and 16b. Two piezoelectric elements 16a and 16b are also connected to the non-inverting input terminal and the inverting input terminal of the differential amplifier circuit 22, respectively. The output terminal of the differential amplifier circuit 22 is connected to the input terminal of the synchronous-detection circuit 24, and the output terminal of the synchronous-detection circuit 24 is connected to the input terminal of the smoothing circuit 26.

In the vibration gyroscope shown in FIG. 5, with the impedances of resistors 18a and 18b which serve as the loads of piezoelectric elements 16a and 16b acting as detecting elements being set appropriately, the desired relationship between temperature and sensitivity change rate is obtained and the response is improved, in the same way as in the vibration gyroscope shown in FIG. 1. In addition, the detecting sensitivity of the vibrator increases and the S/N ratio is improved.

In the above-described embodiments, a vibration member having a regular triangular prism shape is used. The vibration member may have another prism shape such as a cylindrical shape and a quadrangular prism shape.

In the above-described embodiments, three piezoelectric elements are used only two piezoelectric elements for driving and detection may be used. The number of piezoelectric elements used can be changed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibration gyroscope comprising:
   a vibrator having first and second detecting elements for obtaining a signal corresponding to a rotation angular velocity, each of the first and second detectors having an impedance; and
   first and second loads each having an impedance, the first and second loads being connected to said first and second detecting elements, respectively;
   wherein the impedances of said first and second loads are different than the impedances of said first and second detecting elements in a matching condition, respectively.

2. A vibration gyroscope according to claim 1, wherein the impedance of each of said first and second loads have a value which is selected to achieve a desired relationship between temperature and sensitivity change rate.

3. A vibration gyroscope in accordance with claim 2, wherein the impedances of said first and second loads are lower than the impedances of said first and second detecting elements in a matching condition, respectively.

4. A vibration gyroscope in accordance with claim 2, wherein the impedances of said first and second loads are higher than the impedances of said first and second detecting elements in a matching condition, respectively.

5. A vibration gyroscope according to claim 1, wherein the first and second loads are first and second resistors.

6. A method for adjusting the characteristics of a vibration gyroscope which has first and second detecting elements each having an impedance for obtaining a signal corresponding to a rotation angular velocity, which method comprises the steps of:
   connecting first and second loads each having an impedance to said first and second detecting elements, respectively, the impedances of said first and second loads being different than the impedances of said first and second detecting elements in a matching condition, respectively.

7. A method for adjusting the characteristics of a vibration gyroscope according to claim 6, wherein the impedance of each of said first and second loads has a value which is selected to achieve a desired relationship between temperature and sensitivity change.

8. A method for adjusting the characteristics of a vibration gyroscope in accordance with claim 7, wherein the impedances of said first and second loads are lower than the impedances of said first and second detecting elements in a matching condition, respectively.

9. A method for adjusting the characteristics of a vibration gyroscope in accordance with claim 7, wherein the impedances of said first and second loads are higher than the impedances of said first and second detecting elements in a matching condition, respectively.

* * * * *